No. 632,566. Patented Sept. 5, 1899.
W. T. HANAWAY.
MACHINE FOR GENERATING AND UTILIZING NOXIOUS FUMES.
(Application filed June 8, 1899.)
(No Model.)
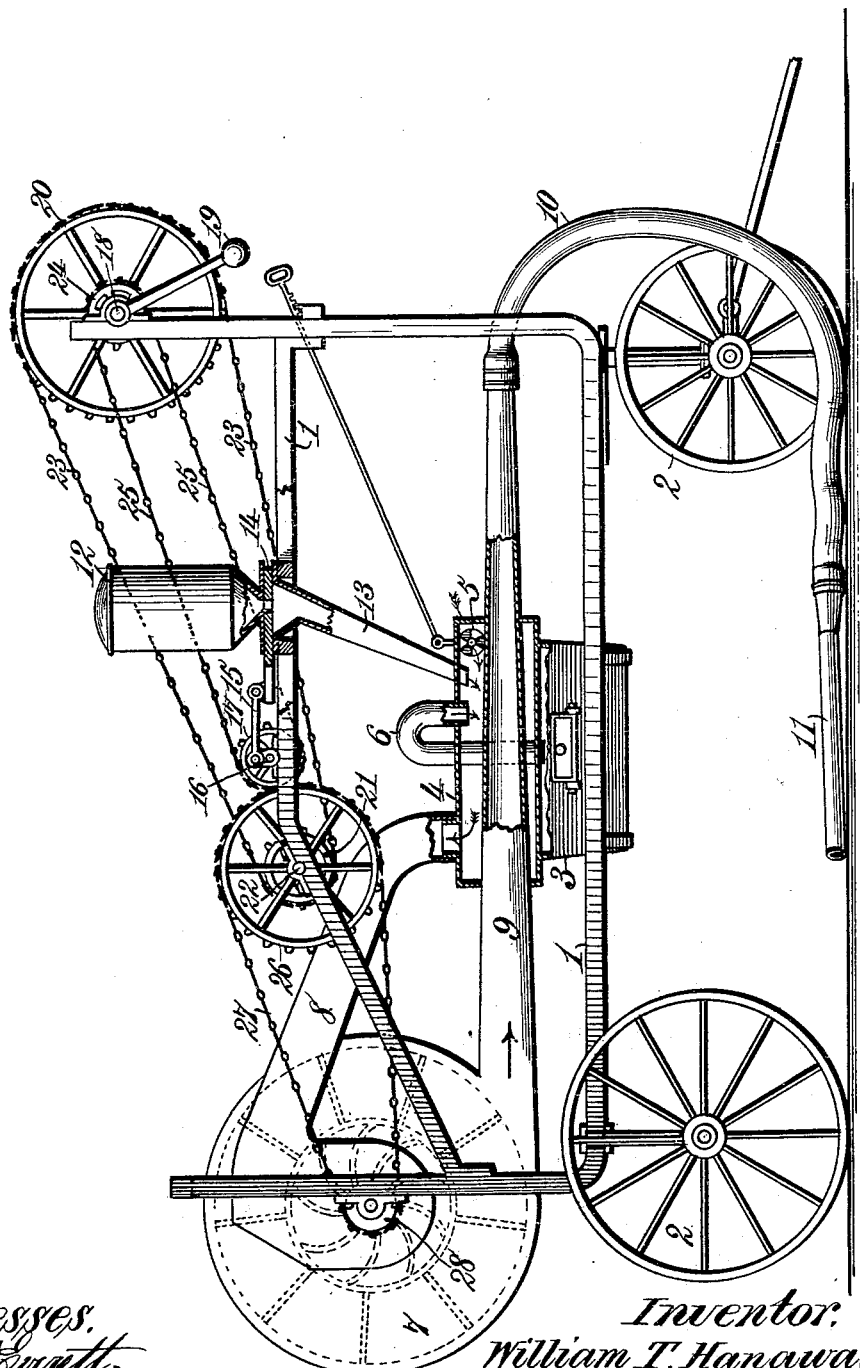
Witnesses.
Robert Everett
H. B. Keefer
Inventor:
William T. Hanaway.
By James L. Norris
Atty.

UNITED STATES PATENT OFFICE.

WILLIAM T. HANAWAY, OF SEYMOUR, TEXAS.

MACHINE FOR GENERATING AND UTILIZING NOXIOUS FUMES.

SPECIFICATION forming part of Letters Patent No. 632,566, dated September 5, 1899.

Application filed June 8, 1899. Serial No. 719,794. (No model.)

*To all whom it may concern:*

Be it known that I, WILLIAM T. HANAWAY, a citizen of the United States, residing at Seymour, in the county of Baylor and State of Texas, have invented new and useful Improvements in Machines for Generating Noxious Fumes and Utilizing the Same for the Destruction of Animal Life, of which the following is a specification.

The object of my invention is to provide a machine for generating noxious fumes or gases and forcing or conveying the same to a distant point for the destruction of animal life.

The invention is particularly designed for use as an exterminator for prairie-dogs, means being provided whereby the fumes of sulfur may be discharged into the dog-holes, which suffocate the dogs and cause their instant death.

Specifically stated, the invention consists of a fire-box or heater, a roasting-chamber or generator above the heater, a suction-fan, a conduit leading from the generator to said fan, a pipe or conduit leading from said fan through said generator and discharging into the dog-hole, a hopper for sulfur leading into the generator, feed mechanism therefor, a drive-shaft, gearing between said drive-shaft and said fan, and feeding mechanism whereby upon the actuation of the former the latter will be operated.

The invention also consists in certain details of construction and combinations of parts, which will be hereinafter more fully described and claimed.

In the drawing forming part of this specification the figure thereof represents a sectional side elevation of a device constructed in accordance with my invention.

The frame 1 of the machine is mounted upon wheels 2, by means of which the machine may be readily transported from place to place. Secured centrally of the frame 1 is a fire-box or heater 3, above which is a roasting-chamber or generator 4, which is provided with an opening for the admission of air controlled by a valve 5, as clearly shown. Leading from the fire-box or heater 3 and communicating with the roasting-chamber or generator 4 is an auxiliary suction-pipe 6, for a purpose which will presently appear. At the rear end of the frame 1 is mounted a fan 7, communicating with the casing of which and leading from the generator 4 is a suction pipe or conduit 8. Leading from the fan-casing and extending through the generator 4 is a force-pipe 9, which has a flexible connection 10 between it and the nozzle 11, which is intended to be inserted into the prairie-dog hole. Also mounted in the frame above the fire-box and generator is a hopper 12 for the supply of sulfur to the generator 4, said hopper communicating with said generator through a chute 13. Feeding mechanism, consisting of a cut-off slide 14, is provided between the hopper 12 and the chute 13, the same being actuated through a pitman 15, pivoted to a crank-arm 16 on the shaft to which the sprocket-wheel 17 is secured.

The operating mechanism for the machine consists of the drive-shaft 18, having a crank 19 thereon, by means of which it can be turned, a sprocket-wheel 20, secured to said shaft and gearing with a sprocket-wheel 21 on the counter-shaft 22 through the chain 23. The shaft 18 is further provided with a sprocket-wheel 24, which is geared with the sprocket-wheel 17 through the chain 25. In addition to the sprocket-wheel 21 the counter-shaft 22 carries a sprocket-wheel 26, which is geared through the sprocket-chain 27 with a sprocket-wheel 28 on the shaft of the fan 7.

Constructed as above described the operation is as follows: It will be understood, of course, that the fire is lighted in the fire-box 3, and that a supply of sulfur has been fed into the generator 4, and that the valve 5 is open for the admission of air to said generator. By turning the shaft 18 through the crank 19 the feeding mechanism for the hopper 12 and the fan 7 is thrown into operation. This causes an intermittent but continuous feed of sulfur from said hopper 12 to the generator 4 and a suction through the conduit 8 from the generator 4 into the fan-casing. This draws off the fumes of sulfur which have been generated, and the same are forced by the fan through the conduit 9, flexible coupling 10, and nozzle 11 into the prairie-dog hole or other place where said fumes are to be used. By means of the auxiliary or supplemental suction-pipe 6 a forced draft is given to the fuel in the fire-box 13 and the products of combustion are led into the generator 4 and drawn off with the sulfur fumes and utilized for the destruction of animal life.

Having thus described my invention, what I desire to secure by Letters Patent is—

1. In an apparatus for generating noxious fumes or gases and utilizing the same for the destruction of life, the combination with a fire-box or heater, of a generator, a fan, a conduit leading from said generator to said fan, a conduit leading from said fan for the discharge of the fumes or gases, and an auxiliary suction-pipe leading from the fire-box to the generator.

2. In an apparatus for generating noxious fumes or gases and utilizing the same for the destruction of life, the combination with a fire-box or heater, of a generator, a fan, a conduit leading from said generator to said fan, and a conduit leading from said fan for discharging the fumes or gases, the same passing through said generator.

3. In an apparatus for generating noxious fumes or gases and for utilizing the same for the destruction of life, the combination with a fire-box or heater, of a generator, a fan for drawing off the fumes or gases from said generator and for discharging the same at the point where they are to be used, a hopper for the supply of sulfur communicating with said generator, feed mechanism therefor, and means for actuating said feed mechanism and said fan simultaneously.

4. In an apparatus for generating noxious fumes or gases and for utilizing the same for the destruction of life, the combination with a fire-box or heater, of a generator having a valve-controlled opening therein, an auxiliary suction-pipe leading from said fire-box to said generator, a fan, a conduit leading from said generator to said fan for drawing off the fumes or gases, and a conduit leading from said fan and passing through said generator for discharging the fumes or gases, and means for supplying sulfur or other material from which the fumes are made to said generator.

In testimony whereof I have hereunto set my hand in presence of two subscribing witnesses.

WILLIAM T. HANAWAY.

Witnesses:
 BEN GLASGOW,
 J. B. HARVEY.